Oct. 10, 1950   J. F. NAYLOR   2,525,711
DOUGH MOLDING AND CUTTING MACHINERY

Filed Feb. 20, 1948   2 Sheets-Sheet 1

Joseph Francis Naylor Inventor

By

J. Victor Armstrong Attorney

Joseph Francis Naylor Inventor

By

J. Victor Armstrong Attorney

Patented Oct. 10, 1950

2,525,711

UNITED STATES PATENT OFFICE 2,525,711

DOUGH MOLDING AND CUTTING MACHINERY

Joseph Francis Naylor, Newton-le-Willows, England, assignor to T. & T. Vicars Limited, Earlestown, Newton-le-Willows, England, a British company Application February 20, 1948, Serial No. 9,767
In Great Britain December 9, 1947

1 Claim. (Cl. 107—24)

This invention relates to improvements in dough moulding and cutting machines of the type in which the cutter shells are operated by eccentrics whilst embossing tools coaxially disposed therewith are displaced by cams, particularly useful in the shaping and cutting out of biscuits from a sheet of dough.

The operation of impressing and cutting out the biscuits is known in the trade as embossing and cutting and a well known method is to use a set of cutters each of which sets comprises a shell of metal which corresponds with the outline of the biscuits, whilst working inside the shell is the impresser or embossing tool, the face of which is engraved and/or shaped in a suitable manner to give the required pattern to the dough piece.

Biscuit cutting machines are known in which the embossing centres are reciprocated by means of eccentrics and therefore move continuously throughout the cycle. For a part of the cycle the cutter beam, to which the cutter shells are connected, rests upon and moves with the embosser beam, being retained thereon by spring means, for the remaining portion of the cycle the shells, just before and after the full impression point, being displaced and actuated by a cam control stop, so that the effective cutting action is imparted by the said springs.

An object of the present invention is to provide means whereby the timing of the action of the embossing tools on the dough can be adjusted while the machine is running.

According to the present invention a follower is disposed between the operating cam and a link or other member connected to the embossing tools to be operated by said cam, the follower being displaceable relatively to the centre of the cam so that the timing of operation of the embossing tools can be adjusted whilst the machine is running.

The invention is further described with reference to the accompanying drawings, in which.

Figure 1:
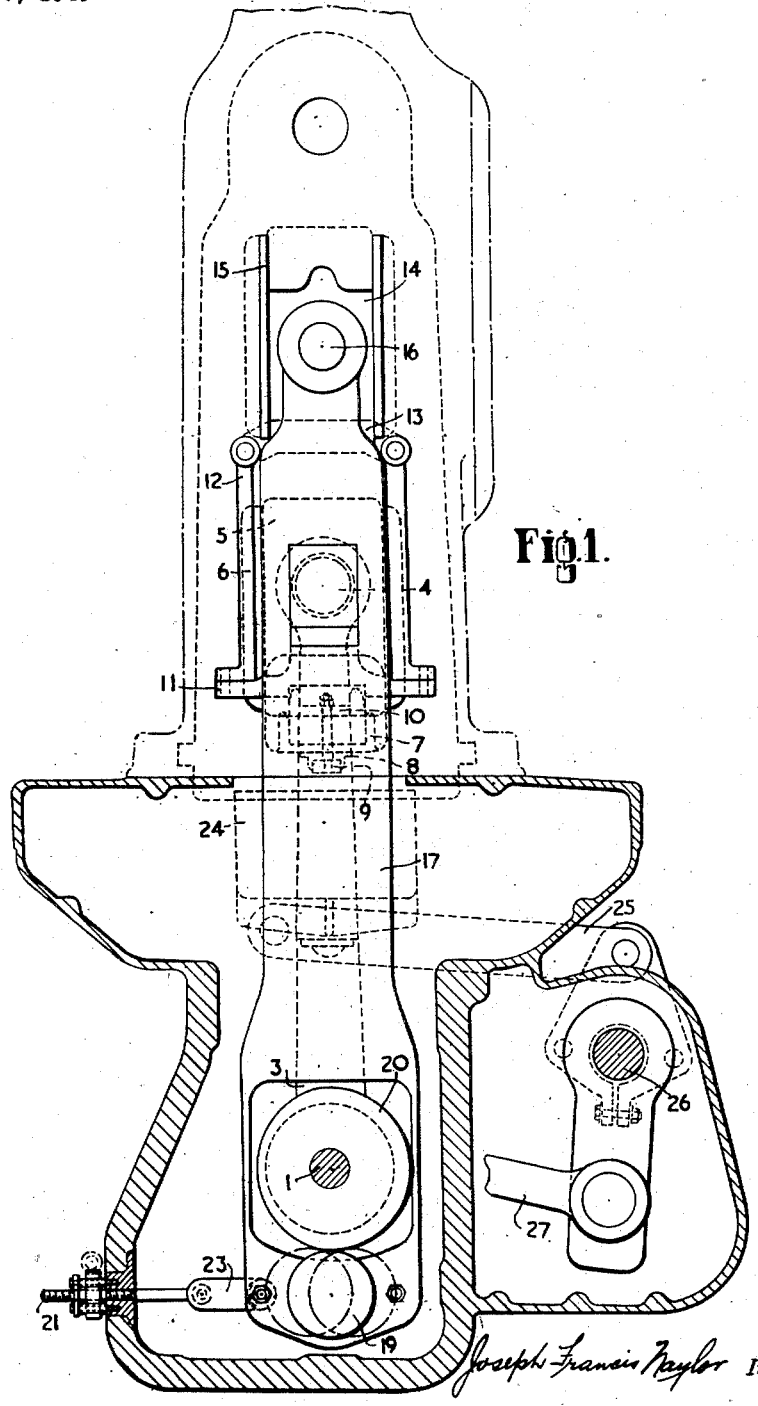
Figure 1 is an end elevation, partly in section, of a machine for cutting and embossing dough in the formation of biscuits.
Figure 2:
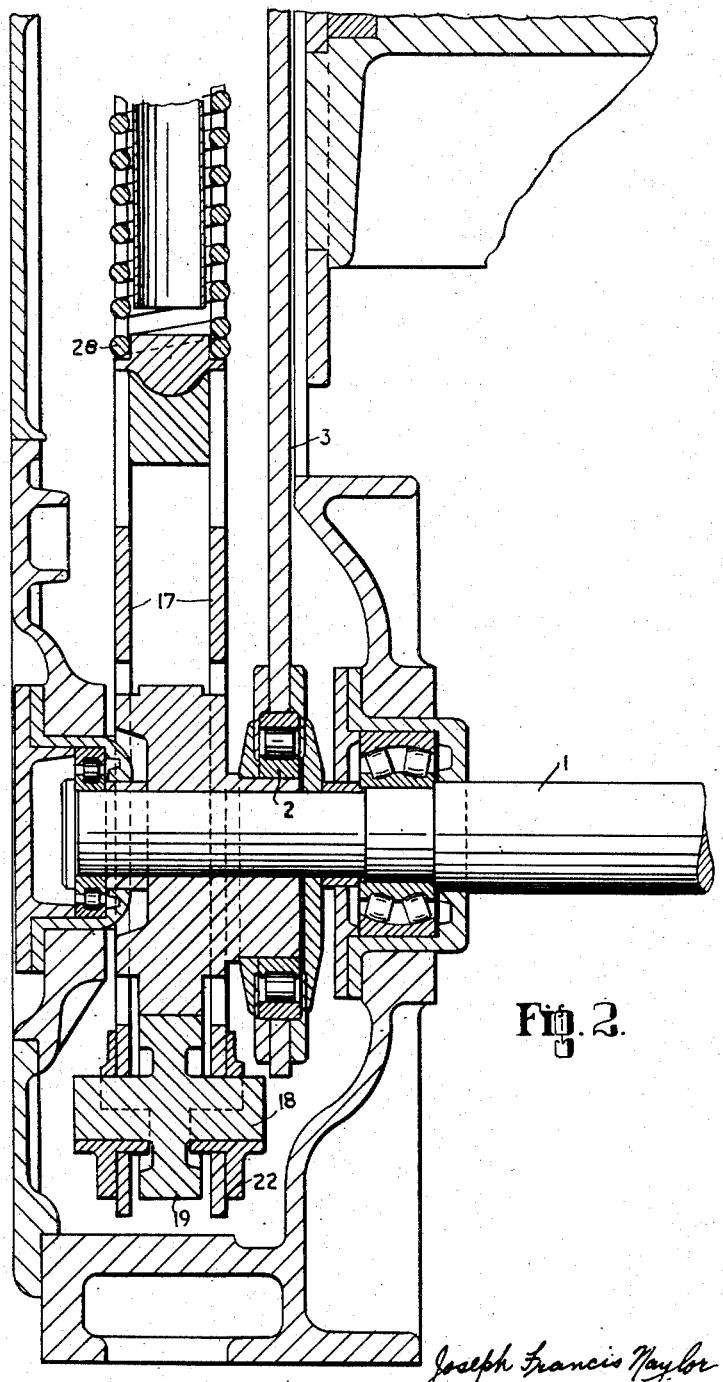
Figure 2 is a partial side sectional view on an enlarged scale.

A main driving shaft 1 has an eccentric 2 mounted thereon, the connecting rod 3 of which is pivoted at 4 to a slide 5 displaceable in guides 6 on links 12 and carrying at its base a yoke 7 at the lower end of which are disposed cutters 8.

Coaxially mounted within these cutters are impresser or embossing tools 9 mounted on a crossbar 10 secured to a plate 11 suspended by links 12 from a yoke 13 secured to a block 14 sliding in guides 15 in the frame of the machine, which block 14 has a pivotal connection 16 to connecting rods 17 slotted at their base to receive the supporting stub shaft 18 for a follower or roller 19 co-operating with a face cam 20 on the shaft 1. The cutters are moved in one direction by the cam and are returned by spring 28 disposed between the connecting rods 17 and the frame of the machine. The roller 19 can be displaced angularly relatively to the centre of the shaft 1 in the slot in the lower end of the connecting rod 17 by a hand wheel or the like mounted on a threaded spindle 21 and connected to straps 22 surrounding the stub shaft 18 by means of a link 23.

The usual table 24 moving step by step with a conveyor supporting a dough sheet, from which biscuits or the like articles are to be cut and simultaneously embossed, can be reciprocated by means of a link 25 from a crank arm on a shaft 26 oscillated by a connecting rod 27 from an eccentric or the like on the shaft 1.

It will consequently be seen that the moment of engagement of the impressor or embossing tools with the dough sheet and the moment of release of the dough sheet by the said tools relatively to the time of engagement of the dough sheet by the cutting tools and release therefrom, can be adjusted as desired and, moreover, whilst the machine is in operation.

I declare that what I claim is:

A machine for forming articles from a sheet of plastic material, including cutter shells, embossing tools coaxially disposed therewith, a main driving shaft, eccentrics on said shaft for displacing said cutter shells relatively to the plastic sheet material, a reciprocating block connected to said embossing tools, guides for said block, an operating cam for reciprocating said block in said guides, a connecting rod pivoted to said block, a cam follower mounted on said connecting rod, means to rotate said cam and said eccentrics in synchronism, and means to displace said follower relatively to said connecting rod so that the timing of operation of the embossing tools can be adjusted whilst the machine is running.

JOSEPH FRANCIS NAYLOR.

REFERENCES CITED

The following references are of record in the file of this patent:

UNITED STATES PATENTS

| Number | Name | Date |
|---|---|---|
| 1,272,018 | Dietze | July 9, 1918 |
| 1,399,723 | Blache | Dec. 6, 1921 |

FOREIGN PATENTS

| Number | Country | Date |
|---|---|---|
| 474,782 | Great Britain | Nov. 8, 1937 |